United States Patent
Bellessort et al.

(10) Patent No.: US 10,084,882 B2
(45) Date of Patent: Sep. 25, 2018

(54) METHOD FOR PROCESSING REQUESTS AND SERVER DEVICE PROCESSING REQUESTS

(71) Applicant: CANON KABUSHIKI KAISHA, Tokyo (JP)

(72) Inventors: Romain Bellessort, Rennes (FR); Hervé Ruellan, Rennes (FR); Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 14/630,468

(22) Filed: Feb. 24, 2015

(65) Prior Publication Data
US 2015/0244765 A1    Aug. 27, 2015

(30) Foreign Application Priority Data

Feb. 27, 2014    (GB) .................................. 1403457.3

(51) Int. Cl.
*G06F 9/50*      (2006.01)
*H04L 29/08*     (2006.01)
*H04L 12/911*    (2013.01)

(52) U.S. Cl.
CPC .............. *H04L 67/322* (2013.01); *G06F 9/50* (2013.01); *G06F 9/5027* (2013.01); *G06F 9/5038* (2013.01); *H04L 47/70* (2013.01); *G06F 9/5005* (2013.01)

(58) Field of Classification Search
CPC ..... H04L 47/70; G06F 9/5027; G06F 9/5038; G06F 9/5005
See application file for complete search history.

(56) References Cited

U.S. PATENT DOCUMENTS

| 2002/0069279 | A1  | 6/2002 | Romero et al. |
| 2002/0083117 | A1* | 6/2002 | Goddard ................. H04L 29/06 718/103 |
| 2003/0037092 | A1* | 2/2003 | McCarthy ............. G06F 9/5061 718/104 |
| 2004/0034856 | A1  | 2/2004 | Boudnik |

(Continued)

FOREIGN PATENT DOCUMENTS

EP    1970805 A1    9/2008

*Primary Examiner* — Jeong S Park
(74) *Attorney, Agent, or Firm* — Canon U.S.A., Inc. IP Division

(57) ABSTRACT

The invention relates to a server and a method for processing requests when several requests compete within the same connection having fixed resources. Conventionally, a priority scheme provides priority values for a priority parameter that express priorities relatively to the priorities of other requests, meaning that a relative allocation of resources is obtained for each request. To achieve a better control on the server by the client, the invention provides specific possible values for the priority parameter that correspond to respective processing profiles. Each processing profile represents specific server behavior for resources allocation, by defining a predefined amount of resources. Thus, the client may choose between using the specific possible values to control the exact amount of resources that will be allocated by the server to process some specific requests, and using the other possible values that correspond to a relative allocation of resources as already done in known techniques.

20 Claims, 5 Drawing Sheets

(56) References Cited

U.S. PATENT DOCUMENTS

| | | |
|---|---|---|
| 2004/0117790 A1 | 6/2004 | Rhine |
| 2007/0083868 A1* | 4/2007 | Sankaranarayan ... G06F 9/5038 718/104 |
| 2011/0131399 A1* | 6/2011 | Sainath ................. G06F 11/106 713/2 |
| 2013/0007757 A1* | 1/2013 | Chambliss ................ G06F 9/46 718/103 |
| 2015/0120932 A1* | 4/2015 | Vissamsetti ............. H04L 47/70 709/226 |

* cited by examiner

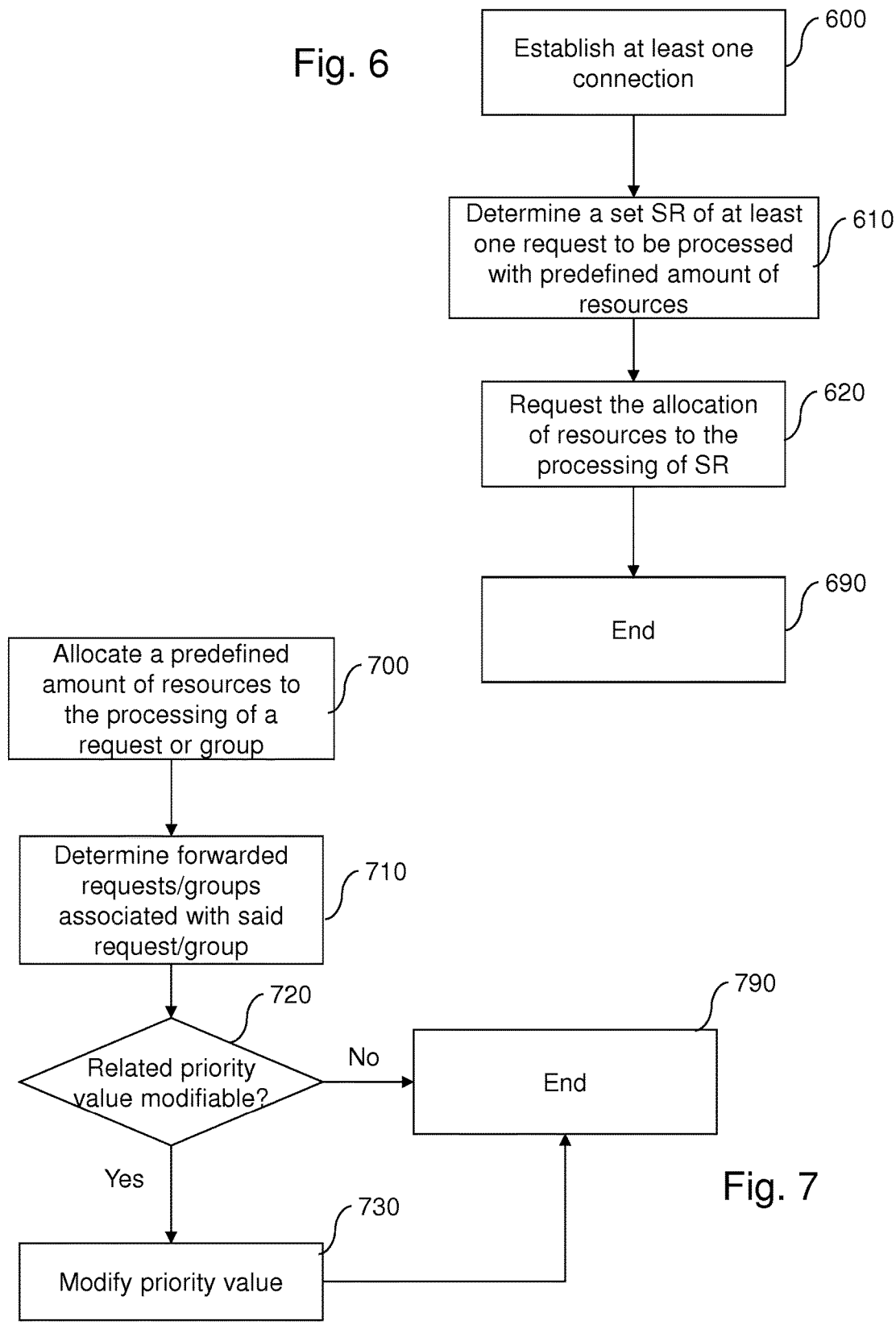

METHOD FOR PROCESSING REQUESTS AND SERVER DEVICE PROCESSING REQUESTS

This application claims the benefit under 35 U.S.C. § 119(a)-(d) of United Kingdom Patent Application No. 1403457.3, filed on Feb. 27, 2014 and entitled "METHOD FOR PROCESSING REQUESTS AND SERVER DEVICE PROCESSING REQUESTS". The above cited patent application is incorporated herein by reference in its entirety.

FIELD OF THE INVENTION

The present invention relates generally to communication networks and more specifically to a method for processing requests and a server device processing requests in a protocol where a plurality of requests and responses can be sent in parallel within one and the same connection.

The invention particularly applies to the processing of HTTP/2 exchanges which is described below for ease of explanation.

BACKGROUND OF THE INVENTION

HTTP/2 is a new version of the HTTP protocol currently being specified by the IETF (see HTTP version 2, Internet draft dated Feb. 13, 2014, available at http://tools.ietf.org/html/draft-ietf-httpbis-http2-10).

It is well-known that the HTTP protocol allows a client device and a server device to communicate through the exchange of requests and responses.

Conventionally, requests are sent by the client device to the server device, which in return, sends responses.

As defined by the IETF, the HTTP requests and responses are transmitted over a TCP connection established between the client and server devices.

The earliest versions of HTTP relied on different TCP connections to respectively convey each pair of (request, response).

The most recent versions of HTTP allow reusing the same TCP connection to exchange a plurality of pairs of (request, response).

In the particular case of HTTP/2, one and the same TCP connection is used between the client and server devices to exchange all the requests and responses. This makes it possible for HTTP/2 to multiplex requests and responses and even to intermingle parts of them. For instance, the client device may start sending a first request, then sends a second request, and then finishes sending its first request. On the other side, the server device may respond to the requests from the client device in any order, for example by intermingling parts of different responses.

To handle efficiently each pair of request and response, and thus to allow efficient multiplexing, HTTP/2 uses a stream identifier (ID), usually a 31-bit integer value, to identify each of the pairs. A stream can be seen as a bidirectional channel between the client and server devices used to exchange one request and the corresponding response in the established TCP connection.

Each time a new request is sent by the client device, a new stream is created. The request is sent through one or more HTTP/2 frames as defined in the above publication, each of them storing the corresponding stream ID in its frame header. The above multiplexing thus consists in multiplexing such HTTP/2 streams within the same TCP connection.

A stream is usually closed once the response associated with a given request has been received by the client device that originated said request. The closure of the stream means that the stream ID is made available for a new request/response exchange.

Since the stream is provided for a single request and the corresponding response, the words "stream" and "request" or "stream" and "response" are indifferently used in the description below because the processing of a request/response by any of the client and server devices means the same as the processing of the corresponding stream by the same device.

Be HTTP/2 or any other protocol where a plurality of requests and responses can be sent in parallel within one and the same connection, the way, and more particularly the order in which, the server device processes the plurality of requests received through the same connection is an issue for the client device. This is because the latter may desire that some requests be processed in priority compared to other requests.

HTTP/2 introduces priorities to the requests for the client device to specify such order or at least to try to drive the server device to process some requests in priority. To do so, the client device may specify a priority parameter value within a frame used to create a new stream, known as HEADERS frame, or within a frame, known as PRIORITY frame, that can be sent at any time for an existing stream to dynamically modify priorities of pending requests.

Several mechanisms for prioritization have been proposed and are described with details below.

For example, in the above publication, a 31-bit priority parameter integer value is provided with 0 representing the highest priority and $2^31-1$ representing the lowest priority (or vice versa). The priority parameter integer value expresses the relative priority of a stream (or a request). The server device can use (but this is not mandatory) this information to preferentially allocate some of its resources to process a given request.

However, explicitly setting the priority parameter integer value for a request does not guarantee any particular processing or transmission order for the request and corresponding response relative to any other stream. Nor is there any mechanism provided by which the client device of a request can force or require the server device to process concurrent requests of the same connection in a particular order.

Since the priority as currently known in HTTP/2 and other protocols where a plurality of requests and responses can be sent in parallel within one and the same connection only expresses the priority of a request relatively to the priorities of other pending requests (i.e. the processing of the request depends on other priority parameter values associated with the other requests), the client device lacks control over the server device, in particular regarding the scheduling and processing of responses by the latter.

For example, the behaviour of the server device when handling a request may somehow differ from what is expressed by the priority parameter value associated with the request. For instance, the server device may start sending data (response) relating to low priority requests because the data are readily available in a front-end cache, while the data for highest priority requests need to be requested from a backend which thus needs to compute them.

The present invention has been devised to address at least one of the foregoing concerns.

SUMMARY OF THE INVENTION

According to a first aspect of the invention, there is provided a method of processing requests in a server device, comprising, at the server device, the steps of:

receiving requests from a client device within one and the same connection established with the client device;

receiving, from the client device, a priority parameter value associated with at least one designated request of the received requests;

allocating resources of the server device for processing at least one target request of the received requests based on the priority parameter value; and processing the target request using the allocated resources;

wherein if the received priority parameter value belongs to a first subset of possible values for the priority parameter, the server device allocates, for processing the target request, a predefined (or prefixed) amount of resources that is specific to the received priority parameter value; and if the received priority parameter value belongs to a second subset of possible values for the priority parameter, the server device allocates, for processing the target request, an amount of resources that depends on other priority parameter values associated with other received requests.

As defined above, the invention supplements the conventional priority parameter values (the second subset, which values define relative priorities from other requests) with some specific values for the priority parameter (the values of the first subset) that define a predefined (or prefixed) amount of resources to be used to process one or more target requests (or streams). The association of a specific priority parameter value with the corresponding predefined amount of resources may be seen as a predefined processing profile or scheme within the server device.

As being "prefixed" or "predefined", the amount of resources in such predefined processing profile of the server device is independent from other priority parameter values associated with other received requests, i.e. from the amount of resources that may be allocated for processing these other received requests.

By using these specific priority parameter values defining the predefined processing profiles for the server device, the client device is thus able to indicate and thus control the exact (predefined) amount of resources it desires the server device uses for processing one or more specific (target) stream.

Resources may for instance be processing resources (CPU, standing for Central Processing Unit, the processing capacity [in Instructions per second—IPS—or FLoating-point Operations Per Second—FLOPS] of which may be partly or entirely allocated upon request) and/or memory resources and/or network resources (e.g. bandwidth capacity). Other resources available at the server device may be taken into account. The resources available for allocation may be all the resources of the server device; resources first allocated to the current connection; or even resources allocated to a group of pending connections, preferably including the current connection.

The processing of a target request (or stream) by the server device may refer to its parsing and/or the generation of a corresponding response and/or the transmission of the response to the client device.

Correspondingly, there is provided a server device in a communication network, comprising:

at least one predefined processing profile which associates a predefined amount of resources of the server device with a specific priority parameter value;

a receiving module configured to receive requests from a client device within one and the same connection established with the client device and to receive, from the client device, a priority parameter value associated with at least one designated request of the received requests;

a resource allocating module configured to allocate resources of the server device for processing at least one target request of the received requests based on the received priority parameter value; and a processor to process the target request using the allocated resources;

wherein the resource allocating module is configured:

if the received priority parameter value belongs to a first subset of possible values for the priority parameter, to determine a predefined processing profile based on the received priority parameter value and to allocate, for processing the target request, the predefined amount of resources corresponding to the determined predefined processing profile; and if the received priority parameter value belongs to a second subset of possible values for the priority parameter, to allocate, for processing the target request, an amount of resources that depends on other priority parameter values associated with other received requests.

The server device has the same advantages as the method defined above. Examples of server devices include a data server and a proxy server.

Further embodiments of the invention are defined in the dependent appended claims and are explained below in terms of method features.

In some embodiments, one possible value of the first subset defines an amount of zero resource for allocation to the processing of the target request or requests. This makes it possible for the client device to control the server device for pausing the processing of some requests. Pausing the processing of some requests can be of high benefits for the client device which needs high priority processing of another request.

In a particular and related embodiment, the received priority parameter value equals the one possible value so as to pause the processing of the target request or requests; and the method further comprises resuming the processing of the target request or requests upon occurrence of an event triggering the release of the predefined amount of allocated resources. Full control of the processing of the requests can thus be obtained by the client device when the latter is able to also control the release triggering events.

Examples of release triggering events include: receiving a new priority parameter value belonging to the second subset for the designated request or requests (this reception has the effect of releasing the constraints on allocated resources); receiving a new priority parameter value belonging to the second subset for the target request or requests (in particular when the target requests are paused); the elapsing or expiry of a predefined amount of time from the allocation of the predefined amount of resources; the absence of other request being processed according to the conventional approach, i.e. based on priority values of the second subset leading to a relative allocation of resources.

According to a particular embodiment, the processing of the target request or requests is resumed upon occurrence of a release triggering event, the target request or requests being assigned, when resuming, priority parameter value or values associated with them just before they were paused. This requires the server device to save in memory such previous priority parameter values, in order to recover them upon resuming the processing of the target requests.

In some embodiments, one possible value of the first subset defines a predefined amount equal to all the resources available at the server device for allocation to the processing of the target request or requests. This makes it possible for the client device to control priority processing of some (target) requests by the server device. Note that this approach to actual process some specific target requests is somewhat similar to the approach allocating zero resources. This is because by allocating zero resources, for example to the processing of all the requests but one, the latter one is actually processed with all the resources available.

In a particular and related embodiment, the received priority parameter value equals the one possible value so as to process only the target request or requests with all the resources allocated, thereby suspending the processing of other requests; and the method further comprises, upon occurrence of an event triggering the release of the predefined amount of allocated resources, resuming the processing of the other requests based on priority parameter values associated with them just before they were suspended (i.e. just before the received priority parameter value equal to the one possible value has been received).

Again, the release triggering events may include receiving a new priority parameter value, the expiry of a predefined amount of time; the absence of other requests processed in a conventional way (relative allocation), but may also include in this case (and in any case where a non-null predefined amount of resources is allocated to the processing of target requests), completion of the processing of the target requests. This is because since the processing is completed, the allocated non-null resources are no longer used and may thus be released for another allocation.

More generally the triggering events trigger release of the allocated predefined amount of resources. Such release makes that constraints (in terms of resources for processing requests) are no longer imposed to the requests being processed, be the target ones or other requests.

These provisions make it possible to reduce the number of PRIORITY frames to be sent in order to control the processing of all the pending requests. This is because the possible value as defined in this provision automatically suspends the processing of the other requests due to lack of resources. As a consequence, the freeing of some resources (due to the triggering events) makes it possible for the other requests to be processed again by the server device.

In some embodiments, N+1 possible values of the first subset define amounts of i/N units of resources available at the server device for allocation to the processing of the target request, i varying between 0 and N respectively. Finer control of the server device by the client device is thus obtained.

In some embodiments, one possible value of the first subset defines a predefined absolute amount of resources for allocation to the processing of the target request. For instance, the amount may be a number of units given the resource considered, for example 10 Mbit/s for bandwidth capacity. This makes it possible for the client device to optimally control the processing time for its requests, and thus the time needed to obtain a response in a current stream.

In variants or in combination, one possible value of the first subset defines a predefined amount of resources that is relative to resources available at the server device, for allocation to the processing of the target request. For instance, the amount may be expressed as a percentage of the resources available at the server device. This makes it possible for the client device to take advantage of the full resources available at the server device to efficiently handle the streams.

According to a specific feature, the resources available at the server device are preferably resources allocated by the server device to the connection established with the client device or to a set of connections including the connection. But they may also be all the resources of the server device.

In some embodiments, the at least one target request includes all the requests received from the client device within the connection. This means that no matter the designated request associated with the received priority parameter value is, all the requests are processed using the resources defined by the received priority parameter value (in the corresponding processing profile).

In other embodiments, the at least one target request includes all the requests received from the client device within the connection except the at least one designated request. Note that HTTP/2 defines groups of streams using group ID. In such a case where the received priority parameter value is associated with a group ID (made of the designated requests), all the groups except the one having the group ID may be processed as the target requests according to the invention.

The above provision is particularly efficient when a pausing of processing for a plurality of groups is desired in order to process the group having the group ID in priority.

In other embodiments, the at least one target request is the at least one designated request. This provision makes it possible to control the processing of a specific request. In some embodiments, this is always the case for received priority parameter value belonging to the second subset.

In other embodiments, the at least one target request includes all the requests received from the client device within the connection that are associated with respective priority parameter values that are all above or all below (i.e. exceed) a predefined priority threshold. This is a generic way to control the processing of high priority requests without the need to explicitly list them.

All or part of these embodiments where the target requests vary may be combined for example if several priority parameters are simultaneously used. For instance, a priority may be assigned to each request while a weight (as defined below) may be assigned to each group. In such a case, a specific value for the weight may result in selecting some target requests and a specific value for the priority may result in selecting a subset of these target requests, to eventually process only the subset using a predefined amount of resources available at the server device.

In addition, all these embodiments may be combined with any of the embodiments defining different amount of resources that may be allocated for processing the target requests. This results in obtaining possibly the pausing, the allocation of a predefined amount of resources, or the allocation of all the resources to all the requests (or groups), of/to only the designated request or requests (groups), of/to all the requests (groups) except the designated request or requests or of/to all the requests (groups) that are associated with a high or low priority parameter value (i.e. above or below the threshold defined above).

In some embodiments, the method comprises allocating first the predefined amounts of resources to the target requests for which a priority parameter value belonging to the first subset has been received, and then sharing the remaining resources of the server device between the remaining received requests from which a priority parameter value belonging to the second subset has been received. Of course, the sharing of the remaining resources is preferably performed based on the conventional approach (relative allocation of resources). This ensures the client request for resource allocation to be fully processed by the server device.

The invention is also directed to a non-transitory computer-readable medium storing a program which, when executed by a microprocessor or computer system in a server device of a communication network, causes the server device to perform the steps of:

receiving requests from a client device within one and the same connection established with the client device;

receiving, from the client device, a priority parameter value associated with at least one designated request of the received requests;

allocating resources of the server device for processing at least one target request of the received requests based on the priority parameter value; and processing the target request using the allocated resources;

wherein if the received priority parameter value belongs to a first subset of possible values for the priority parameter, the server device allocates, for processing the target request, a predefined amount of resources that is specific to the received priority parameter value; and if the received priority parameter value belongs to a second subset of possible values for the priority parameter, the server device allocates, for processing the target request, an amount of resources that depends on other priority parameter values associated with other received requests.

The non-transitory computer-readable medium may have features and advantages that are analogous to those set out above and below in relation to the method and server device, in particular that of improving control of the client device over the server device in processing requests from the client device.

Another aspect of the invention relates to a method for processing requests in a server device substantially as herein described with reference to, and as shown in, FIG. 3; FIGS. 3, 4, 5 and 6; FIG. 7 of the accompanying drawings.

Yet another aspect of the invention relates to a server device in a communication network substantially as herein described with reference to, and as shown in, FIG. 2 of the accompanying drawings.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 6 is a flowchart illustrating general steps at the client device to request a specific allocation of a predefined amount of resources for the processing of some target requests, according to some embodiments; and FIG. 7 is a flowchart illustrating steps specific to a proxy server in some embodiments of the invention.

DETAILED DESCRIPTION OF EMBODIMENTS OF THE INVENTION

Figure 1:
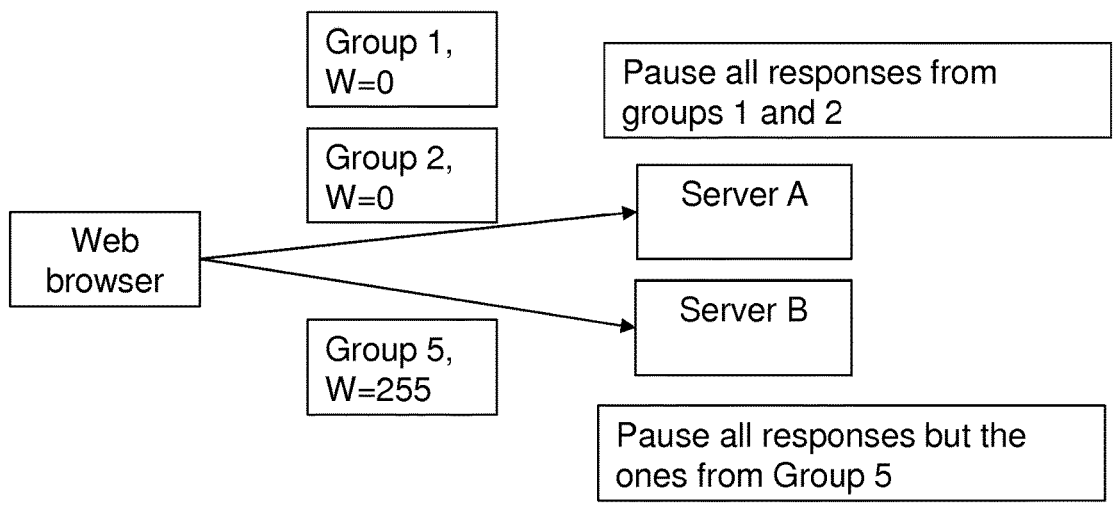
FIG. 1 illustrates an example of use of the invention.

The present invention applies to any protocol where a plurality of requests and responses can be sent in parallel within one and the same connection. This is for example the case of the HTTP/2 protocol as described above, but also the case of the SPDY protocol proposed by Google (registered trademarks). Note that the invention works with different versions of SDPY protocol, which have been used as basis for developing HTTP/2. Any extended version of the HTTP/2 protocol allowing transmitting WebSocket messages on one and the same TCP (standing for Transmission Control Protocol) connection opened for HTTP messages is also eligible for implementation of the invention. Alternatively to TCP, the invention may rely on the usage of a different transport protocol, such as UDP (standing for User Datagram Protocol) or MPTCP (standing for Multipath TCP).

The present invention also regards such protocols where a priority model is implemented to define how the streams (i.e. the corresponding requests and responses) should be processed from the client point of view. The priority model allows expressing this point of view using at least one priority parameter value, to define the relative priority of a stream (a request) compared to other streams of the same connection. This results in having, for the same priority parameter value, an amount of resources allocated for processing the stream that is varying depending on which priority parameter values the other streams are assigned with. As described above, this is the case with the priority model defined in HTTP/2.

Various priority models have been proposed in the context of HTTP/2, which models may be used in a similar way with other protocols. All these priority models make it possible to update the priorities associated with or assigned to a given stream (or request) as long as the stream is not closed, i.e. as long as the corresponding response has not been fully received by the client device. The PRIORITY frames defined in HTTP/2 are used to this end. Updating the priorities is useful for the client device to modify some priorities. As an illustrative example, in a web browser that allows several tabs to process in parallel several web pages, a user may switch between two tabs to change the foreground tab. In such context, the priorities assigned to the data for the requests associated with each of the two tabs should be inversed so to give priority to the new foreground tab: the data for the requests associated with the new foreground tab should be assigned a higher priority than those of the former foreground tab.

Three priority models are now described: a first one relying on an integer value, a second one relying on priority groups and a third one relying on dependencies between streams.

The first mechanism of priorities is included in the current draft version of HTTP/2. It consists for the client device to assign an integer value to each stream, for example using the HEADERS or PRIORITY frame, the integer value being comprised between a minimum value and a maximum value. In HTTP/2, the integer value is 31-bit wide, thus enabling values between 0 and $2^{31}-1$. The server device is able to compare two priorities assigned to two streams, to determine which response is more needed by the client device.

For instance, the response of a stream having a priority parameter value set to 100 is considered as more needed by the client device than a response of a stream whose priority is set to 1. In this exemplary case, the server device generally sends no data corresponding to the response whose priority is 1 before having finished sending the data for the response whose priority is 100. More generally, the server device uses its resources to process and transmit the response associated with the highest priority, to the client device. Of course, the server device handles the stream having the highest priority from among the streams that can be processed. For example regarding the bandwidth resources, the server device should use the TCP connection to send the data for the response having the highest priority from the responses which have data ready to be sent. This means that if the highest priority response has no data ready to be sent, for example because the response is being computed, a response with the next lower priority and data to be sent may be sent in the meantime.

The second mechanism of priorities has been proposed to HTTP/2 standard. It consists in defining priority groups. To do so, group identifiers (IDs) are created that identify groups of streams.

In addition to the stream ID, a DATA or HEADERS or PRIORITY frame may include a group ID to indicate to which group the stream having the stream ID belongs. A group is created as soon as its group ID is first specified in a frame (i.e. if the group ID found in a frame is not associated with an existing group, a new group is created with said ID).

The priority for a group is specified using a weight associated with the group. The weight may be included in the HEADERS or PRIORITY frame, and may be coded onto 8 bits, thereby having a value comprised between a minimum value (e.g. 0 or 1) and a maximum value (e.g. 255 or 256).

Again, the weights are used to determine the relative proportion of resources considered that may be assigned by the server device to each group.

For instance, a first group having a weight equal to 100 should be allocated 10 times more resources than a second group having a weight equal to 10. Practically, this may result in allocating 10 times more bandwidth to the responses of the first group than to the responses of the second group.

The third mechanism of priorities has also been proposed to HTTP/2 standard. It consists in defining dependencies between streams, i.e. a tree of dependencies. To do so, the stream ID identifying the "parent" stream on which a current stream depends may be specified in a frame, such as a HEADERS or PRIORITY frame. In other words, a priority parameter value in such frame includes the stream ID of the parent stream.

For instance, a frame may indicate that a stream B depends on a stream A. This dependency means that the sending of the response forming the stream B should start only once the sending of the response forming the stream A has been completed.

The streams that do not depend on another stream are defined as dependent on a root stream having stream ID=0 (stream ID 0 is never assigned to an actual stream, so it can be used to indicate the absence of any dependency).

Since two or more streams may depend on the same parent stream, the dependency-based priority mechanism provides that the corresponding responses are concurrently processed by the server device after the sending of the response of the parent stream has been completed. For example, assuming a tree of dependencies where a stream A depends on a parent stream B which in turn depends on a grand-parent stream C, and where a stream F depends on a parent stream E which in turn depends on the grand-parent stream C, the request C of the grand-parent stream C is first processed and its corresponding response is sent first. Next, the parent streams B and E are processed in parallel and concurrently. Next, upon completion of each of the parent streams B and E, the processing of the respective stream A or F starts, meaning that stream A may be processed simultaneously to stream E if parent stream B ends before stream E, and similarly stream F may be processed simultaneously to stream B if parent stream E ends before stream B.

A variant to this third mechanism as described until now consists in defining a stack of levels using the dependencies above from the root virtual stream having stream ID 0. Back to the example above, stream C is at the top depth level of the stack, streams B and E belong to the second depth level of the stack and streams A and F belong to the last and third depth level of the stack, regardless now which stream of the upper depth level is the true parent stream for a given stream of the lower depth level.

In this variant, the server device should preferably process requests belonging to the topmost level of the stack. In the example above, it means that the processing of stream A or F cannot start as long as both streams B and E have not ended.

These dependency-based priority mechanisms also provide the ability for the client device to insert a stream between two streams already linked in a dependency relationship. For instance, assuming that the client device has already defined stream B as being dependent on parent stream A, then it may insert stream C between A and B using an appropriate command, resulting in that stream C now depends on stream A, and stream B depends on stream C.

Similarly to the first mechanism above (priority parameter integer value), the server device uses its resources to process the stream or streams at the top of the dependency hierarchy (i.e. depending on stream ID 0) and to send corresponding response or responses to the client device.

For example regarding the bandwidth resources, the server device should use the TCP connection to send the data for the response or responses that are the highest in the hierarchy, provided that they have data ready to be sent.

A simple way to achieve the insertion of a stream between other streams is to use PRIORITY frames to redefine each dependency. In the example above, a first PRIORITY frame is provided to define the dependency of stream C on stream A, and then a second PRIORITY frame to define the dependency of stream B on stream C.

Note that a similar situation happens when using priority parameter integer values as in the first mechanism above. For example, streams S1, S2, S3, and S4 belong to the same group, with the priority values S1=10, S2=5, S3=5, S4=1. As a result, there are three depth levels: (S1, p=10), (S2, S3, p=5), (S4, p=1).

One problem in these two cases is that there is no direct control over a depth level (i.e. priority level or dependency level) to efficiently insert a new stream or to change efficiently the order of the depth levels. For example, moving a priority/dependency level requires moving all its streams. This implies a high cost, in term of number of commands, for updating a priority/dependency level.

Embodiments of the invention provide mechanisms to directly control the levels.

A solution for level control is based on the use of a level flag (which may be included in the PRIORITY frame), to specify whether the priority or dependency applies only to the stream specified in the command or to its whole level.

When defining a priority or dependency for a new stream, if the level flag is not set, the new stream is added to the indicated group, with the indicated dependency on stream or with the indicated priority. As such this new stream is added to the level corresponding to the dependency (i.e. below the dependency level of the stream on which it depends) or to the level corresponding to the priority value specified.

However, if the level flag is set, a new dependency level is created for the new stream, between the dependency level of the stream on which the new stream depends, and the dependency level below this dependency level. Note that nothing particular happens with the level flag set, when a priority for a new stream is defined. The same behaviour as above for the level flag not set applies.

As an example, let consider the situation where streams S1, S2, S3, and S4 belong to the same group with the dependencies S1→0, S2→S1, S3→S1, S4→S2, thus resulting in three dependency levels being defined: (S1)←(S2, S3)←(S4). In this situation if another stream S5 is added as depending on stream S1, with the level flag set, a new dependency level is created and inserted between the level of S1 and the next level, resulting in: (S1)←(S5)←(S2, S3)←(S4).

When updating the priority/dependency for an existing stream, if the level flag is not set, only the stream is updated with the new priority/dependency. However, if the level flag is set, its whole level is updated with the new priority/dependency. This means that the whole level can be moved to another group, or moved somewhere else in the level hierarchy.

Continuing the example, if S2 is updated to become dependent on S1, with the level flag set, the resulting dependency levels are: (S1)←(S2, S3)←(S5)←(S4). Here, the whole level of S2 (i.e. including S3) has been moved.

If S2 is updated to become dependent on S1, with the level flag not set, the resulting levels are: (S1)←(S2, S5)←(S3) ←(S4). Here, only S2 has been moved without S4 which was initially defined as being dependent on S2. In a variant, the dependency of S4 on S2 might be considered to be persistent, meaning that S4 would be moved with S2, resulting in (S1)←(S2, S5)←(S3, S4).

With the priority values, the same result is obtained. Back to the example above where (S1, p=10), (S2, S3, p=5), (S4, p=1), let's denote L1 the priority level for S1, L2 for S2 and S3, and L3 for S4. It results the following dependencies: (L1: S1)←(L2: S2, S3)←(L3: S4).

Adding S5, inside level L4, with parent level L1, would result in: (L1: S1)←(L4: S5)←(L2: S2, S3)←(L3: S4).

Updating level L2 to take precedence over level L4 may be obtained by updating the priority of S2 to level L2 to have level L1 as parent. This would result in: (L1: S1)←(L2: S2, S3)←(L4: S5)←(L3: S4).

Therefore, thanks to the level flag as introduced above, a single command (including the new priority value or the new dependency) is used to move (create/update) a whole level of streams.

Note that the above priority mechanisms may be combined. In particular, the group-based priority mechanism has been proposed to HTTP/2 working group to supplement the first priority mechanism. This combination results in having two priority parameter values: one 31-bit integer value to define the priority for a stream and one 8-bit integer value to define the priority for a group of streams.

The dependency-based priority mechanism has also been proposed to HTTP/2 working group, but to supplement the group-based priority mechanism. This combination results in having two priority parameter values: one 8-bit integer value to define the priority for a group of streams and one value to specify the dependencies between the streams.

The 31-bit priority integer value, the group weight and the dependency indication correspond to a relative number or amount of resources allocated by the server device to handle the corresponding request (stream) or group of requests (streams). The exact number or amount of resources allocated by the server device depends not only on these values, but also on the corresponding priority parameter values assigned to the other requests (streams) or group of requests (streams) that share the same connection with the client device.

For instance, if there is a single group of streams on a given connection, it is allocated all the resources reserved by the server device to this connection, regardless its assigned weight.

In another example, a stream group having a weight equal to 100 will not be allocated the same amount of resources if there is only another other group having a weight equal to 1 (in which case the group with weight 100 is much more favoured with the allocation of roughly 99% of the resources) or if there are 100 other groups having each a weight equal to 1 (in which case the groups with weight 100 will only be allocated about 50% of the resources of the server device).

In addition, within a given group of streams, each stream may be assigned a priority value or a dependency on another stream of the group. In this case also, the response associated with a given stream should not be sent as long as a response associated with each stream having higher priority values or with the parent stream has not been sent.

All these examples show that the amount of resources allocated to a request or requests or to a group of requests depends on the priority parameter values assigned to the other requests or groups of requests in the same connexion between the client and server devices.

In particular, even if a request is assigned the lowest priority (either through priority value, or through dependency), the processing of said request remains dependent on the priority of others requests. Such request would not be sent as long as data for a response associated with a request having a higher priority (in the same group if any) remain. However, the same request having the lowest priority may be processed in some cases, for example when the other requests have the same lowest priority value, in which case all the requests are processed in parallel.

The priority parameters as defined above and as known in the prior art are thus relative.

The present invention provides a better control to the client device for driving the server device when processing requests from the client device.

The server device receives a plurality of requests from the client device within one and the same connection established with the client device; and receives, from the same client device, at least one priority parameter value associated with at least one designated request of the received requests. Note that other priority parameter values may have already been received and processed by the server device to allocate correspondingly resources for processing some requests.

The received priority parameter value is used by the server device to allocate resources of the server device for processing at least one target request of the received requests. With the relative priority parameters as currently known in HTTP/2, the server device allocates, for processing the target request, an amount of resources that depends on other priority parameter values associated with other received requests. The target request or requests to which the resources are allocated are the same as the request or requests designated in the HEADERS or PRIORITY frame in association with the received priority parameter value.

Then the server device processes the target request or requests using the allocated resources. The processing of the target request may designate all or part of parsing the request and/or generating a corresponding response and/or sending the response to the client device. For example, the processing may only include the generation of responses, or the transmission of responses, or both of them.

To achieve the above-mentioned better control, the invention provides some specific possible values for the priority parameter that correspond to respective processing profiles. Each processing profile represents specific server behaviour as far as the allocation of resources is concerned, and defines a predefined amount of resources of the server device. That means that when such specific value is used by the client device, the server device allocates, for processing the target request, the predefined amount of resources that is specific to the priority parameter value as received from the client device, regardless the relative priority parameter values that may have been assigned to other pending requests in the current connection. It results that the client device knows exactly the amount of resources that will be allocated by the server device to process some specific requests. This confirms that the client device achieves a better control of the server device.

In other words, the priority parameter the client device may specify in a HEADERS or PRIORITY frame (in HTTP/2) can take a value from a first subset of possible values which correspond to the specific values defined above and associated with predefined amounts of resources to be allocated, or from a second subset of possible values which correspond to the conventional relative priority values as already existing in HTTP2 (or proposal for HTTP/2).

In practice and as described below in some examples, the end values of the range of possible values (i.e. the first values from 0 and the last values up to the maximum) are reserved for the first subset of "specific" values, while the centre part of the range is used in a conventional way. This is because the centre part is similar to the whole range but slightly reduced, thus providing the same behaviour/order for priorities.

Various predefined amounts of resources may be defined, each corresponding to a specific priority value of the first subset. Note that the priority values belonging to the second subset are not described below since they correspond to the conventional approach described above.

All or part of the examples provided below for the specific priority values of the first subset and corresponding predefined amounts of resources may be used in combination. Note that if the priority parameter applies at stream level, the predefined amount of resources is generally allocated at stream level. Similarly, if the priority parameter applies at group level, the predefined amount of resources is generally allocated at group level. In other words, where "request" is used below in relation with the association of a priority parameter value and/or with the allocation of an amount of resources, the same teaching applies to a "group" of requests within the skills of one skilled in the art.

The resources considered for allocation are for example those made available by the server device for the connection currently considered and may be of various types: for example, processing resources (processing time may be allocated) and/or memory resources (volatile and non-volatile memories) and/or network resources (e.g. bandwidth capacity). Other resources available at the server device may be taken into account. Some of the specific values may be dedicated to the allocation of particular resources while other specific values may be dedicated to the allocation of other resources.

A first predefined amount of resources is the allocation of zero (0) resource for the processing of the target request or requests or of a target group or target groups. That means that the target request or requests are paused, no corresponding response being generated and sent as long as the constraining allocation remains.

Any predefined amount of resources may be declined into variants depending on which target request or requests it is allocated, compared to the request or requests designated in association with the triggering specific priority parameter value.

For example, the target request or requests may include all the requests (or groups of requests) received from the client device within the connection. This approach thus defines a predefined processing profile associating an allocation of zero resource to all the requests.

In a variant, the target request or requests may include all the requests (or groups of requests) received from the client device within the connection except the request or requests designated in association with the triggering specific priority parameter value received by the server device. This approach thus defines another predefined processing profile associating an allocation of zero resource to all the requests except the designated request or requests.

In another variant, the target request or requests may be the request or requests designated in association with the triggering specific priority parameter value received by the server device. This approach thus defines yet another predefined processing profile associating an allocation of zero resource to the designated request or requests.

In yet another variant, the target request or requests may include all the requests received from the client device within the connection that are associated with respective priority parameter values that exceed a predefined priority threshold. This approach thus defines yet another predefined processing profile associating an allocation of zero resource to one or more requests the priority parameter values of which being above or below the threshold.

Considering the 31-bit stream priority value or the 8-bit group priority value, the minimum value (typically 0 for the stream priority value and the group priority value) may be associated with the allocation of zero resource for the processing of all requests or groups of requests in the current connection;

the minimum value+1 (typically 1 for the stream priority value and the group priority value) may be associated with the allocation of zero resource for the processing of the request or requests or groups of requests associated with a given priority indication, for example the request or requests (or groups) designated in association with this minimum value+1 in the HEADERS or PRIORITY frame;

the minimum value+2 (typically 2 for the stream priority value and the group priority value) may be associated with the allocation of zero resource for the processing of all requests or groups of requests except the one designated in association with this minimum value+2 in the HEADERS or PRIORITY frame;

These specific values form part of the first subset as defined above.

A second predefined amount of resources is the allocation of all the resources available at the server device (e.g. reserved for the current connection) for the processing of the target request or requests or of a target group or target groups. "All the resources" may designate all the resources allocated to the current connection by the server device or designate all the resources available, i.e. not yet allocated to other requests using predefined amounts of resources (but relative allocation of resources according to the known techniques). Such a predefined amount of resources should be allocated to very high priority requests or group of requests. In this context, the target request or requests are preferably the request or requests designated in association with the triggering specific priority parameter value received by the server device. This approach thus defines a predefined processing profile associating an allocation of all the resources available to the designated request or requests.

The maximum possible value, which typically depends on the number of bits used to encode said value (typically $2^{31}-1$ for the stream priority value or 255 for the group priority value), is dedicated to the allocation of all the resources to a target request or group of requests.

Practically, an implementation supporting the allocating of all the resources to a target request/group of requests may consider that the maximum priority parameter value is in fact equivalent to an infinite priority parameter value. This is because all the other priority parameter values become relatively null compared to the infinite priority parameter value, so that no resources are allocated for the other priority parameter values.

More generally, additional predefined amounts of resources may be defined and associated with corresponding specific values. These additional predefined amounts may correspond to the allocation of a part of the resources made available by the server device for a given connection. The part of the available resources may be expressed as an absolute amount of resources, for instance 10 Mbit/s for bandwidth capacity, or as a relative amount of resources, for instance 10% of the available bandwidth.

As an example, N predefined amounts of resources may correspond to i/N units of the resources available, i varying between 1 and N respectively. For N=5 and relative (%) units, this results in having five specific values corresponding respectively to the allocation of 20%, 40%, 60%, 80% and 100% of the resources available. For N=10 and an absolute unit equal to the maximum value of the resources, e.g. 10 Kb/s, this results in having ten specific values corresponding respectively to the allocation of 1, 2, 3, 4, 5, 6, 7, 8, 9 and 10 Kb/s.

For instance, the N maximum possible values {maximum value-j}$_{j=1 \ldots N}$ for the priority parameter considered (typically $2^{31}$-N to $2^{31}-1$ for the stream priority value or 255-N to 255 for the group priority value) are associated with the allocation of (10-j)/N units of the resources. This may be applied at the request level or at the group level.

These specific values form part of the first subset as defined above.

Again these N predefined amounts of resources associated with N specific values may be allocated to all the requests/groups, to all the requests/groups except the designated request/group or requests/groups, to only the designated request/group or requests/groups, or to one or more requests/groups the priority parameter values of which being above or below a given threshold.

These approaches may thus define a plurality of other predefined processing profiles associating allocations of various amounts of resources with more or less requests/groups.

In addition, the maximum value-N may be associated with the allocation of zero resource for the processing of the request or requests (or groups) of the current connection that have respective priority values above or below a predefined priority threshold. This specific priority parameter value makes it possible to control the pausing of all the requests (groups) apart from the ones associated with priority parameter values below or above the threshold. Again, this defines another predefined processing profile.

A particular embodiment provides only two specific values in the first subset, a first specific value associated with the allocation of zero resources for processing a given request, and a second specific value associated with the allocation of all the resources available for processing a given request.

Although the specific values as given above as examples are integer values, the invention also applies to priority parameter values that represent dependencies between streams or between groups of streams as described above as the third mechanism of priorities. It is recalled here that the dependency on a request or on a group of requests can be expressed through a reference to a stream ID or group ID. The invention provides that specific identifiers (i.e. not referencing an existing request or group of requests) may be used to control the allocation of predefined amounts of resources by the server device.

The teachings above relating to the specific integer priority values also apply to the specific identifiers. Note that generally the identifiers are expressed as integer values (stream or group ID).

Thanks to the invention, the client device is provided with the capacity to give more precise indications regarding the processing of requests by the server device. In particular, thanks to these specific priority values of the first subset (and thus of the corresponding predefined processing profiles at the server device), the client device can request the server device to pause the processing of some requests or groups of requests (i.e. to allocate 0 resource), or to allocate all the resources to a given request or group of requests and thereby suspending other requests, which allows better controlling the available bandwidth. The client device may in particular use the invention when a given response is urgently needed, by controlling the allocation of all the resources available at the server device for the processing of the corresponding request.

Upon receiving the response, the client device may update the priority parameter values for other requests currently suspended or paused, in order to resume the processing of these other requests. Another criterion for triggering such resuming may be that no request is being processed. Other triggering criteria may be implemented to leave a constrained state resulting from the allocation of a predefined amount of resources (e.g. to trigger the resuming of such processing), as described below.

Some illustrative use cases of the invention are now described.

In a first use case, the client device is currently obtaining video data from the server device, typically over HTTP/2. If the network becomes constrained, the bandwidth may become insufficient to allow a satisfying reception of the video data through a first connection simultaneously to the reception of other data (e.g. data requested by other applications running in background) through the same and other connections. In such a case, the client device may decide to request the pausing of all groups associated with the other connections that are different from the first connection used to convey the video data, and furthermore to request the pausing of all groups of requests in the first connection except the group used for transmitting the video data.

In another use case, a tab of a web browser at the client device is downloading a large file. Each time the user displays a new web page on another tab, the web browser may request the pausing of the group associated with the downloading of the large file, so that the new web page can be displayed more quickly. Once the data for the new web page have been received, the web browser may send a new priority indication to the server device serving the large file so that the downloading of the large file resumes.

FIG. 1 illustrates an example of use of the invention. A web browser at the client device connects to two different web servers: server device A and server device B. As an example, the server A connection may be related to a first tab in the web browser, and the server B connection to a second tab in the web browser.

For each connection, priorities are applied at the group level through weights (i.e. each request/response belongs to a group, said group being assigned a weight indicating the amount of resources the corresponding server device should allocate to it on the given connection).

The web browser obtains various data from server device B, including video data. The requests for video data issued by the client device belong to group 5.

In parallel, the web browser obtains various data from server device A through two groups: group 1 and group 2.

At some point, it appears that the video data are not received quickly enough by the client device from server device B. In response, the web browser decides to request the allocation of zero resource for the processing of all requests except the requests belonging to the video data group (i.e. group 5).

To do so, the web browser sends new priority parameter values to server device A to indicate that the new weight W of group 1 should be 0 and the new weight of group 2 should be 0 too. Server device A knows that a weight of 0 is a specific value of the first subset, which is associated with the allocation of zero resource to the processing of the group identified with the new weight in the PRIORITY frame sent by the web browser. Therefore, server device A temporarily stops processing the corresponding requests of groups 1 and 2. In particular, it stops sending the associated responses to the web browser.

In addition, the web browser sends a priority parameter value to server device B to indicate that the new weight W of group 5 should be 255. Server device B knows that a weight of 255 is a specific value of the first subset, which is associated with the allocation of zero resource to the processing of the requests belonging to other groups (i.e. all the groups except the one identified with the new weight in the PRIORITY frame sent by the web browser). Therefore, server device B stops processing the requests of the other groups (including the sending of the responses), thereby freeing the total amount of resources available for the processing of the video data requests of group 5. It results that only video data responses are sent to the web browser.

In a variant, instead of using weight 255 associated with the allocation of zero resource to all requests except one, the web browser could use another weight, e.g. 254, that defines the allocation of all the resources to said request. Of course, the two values may coexist, but variants exist where only one of the two allocation schemes is implemented.

Later on, enough video data have been buffered in the web browser. A new priority parameter value may be sent by the web browser to server device B to indicate that group 5 should now be assigned a weight of 100. Server device B knows that this value belongs to the second subset, i.e. is not associated with the allocation of a predefined amount of resources to the processing of at least one request. Therefore, the previous indication of weight 255 is no longer relevant: group 5 is no longer allocated the previous predefined amount of resources and the other groups are thus freed from the allocation of zero resources. Accordingly, the processing of the requests of these other groups is resumed, with the same priority parameter values they had before they were paused or suspended (the server device still has these values in memory since the allocation of zero resources resulted only from the assignment of weight 255 to group 5, meaning that these values were not modified at that time).

In parallel, the web browser may send a priority parameter value to server device A to indicate that groups 1 and 2 should now be assigned a weight of 10. Server device A knows that weight 10 belongs to the second subset, i.e. is not a specific value associated with the allocation of a predefined amount of resources to the processing of at least one request. Therefore, server device A resumes the processing of the requests belonging to groups 1 and 2 based on the conventional priority scheme.

Figure 2:
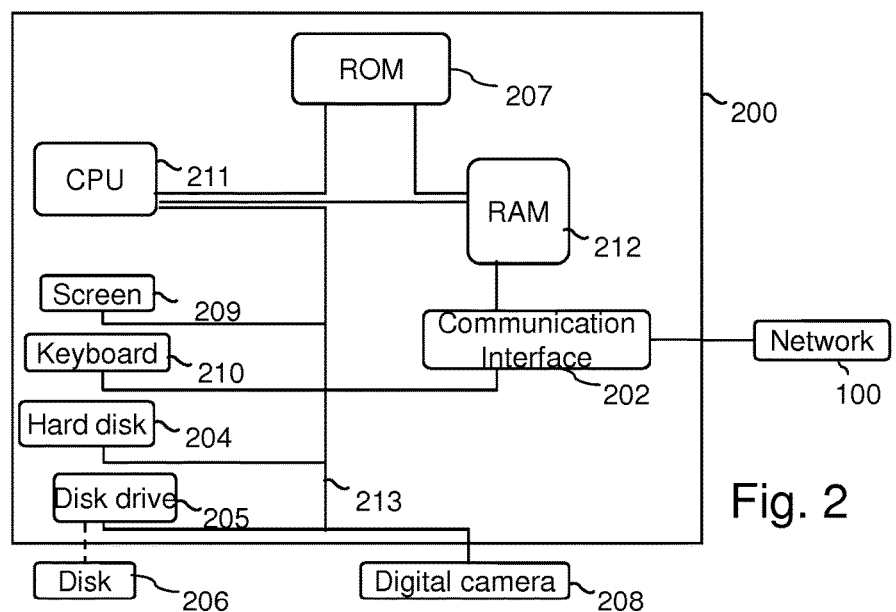
FIG. 2 is a block diagram illustrating components of a communication device in which embodiments of the invention may be implemented.

FIG. 2 schematically illustrates a communication device 200, either a client device or a server device. Since the client device of the invention is conventional except that it has knowledge of the specific priority values and associated processing profiles (i.e. predefined amounts of resources), the description below mainly relates to the server device. This server device or communication device 200 is configured to implement at least one embodiment of the present invention. The communication device 200 may be a device such as a micro-computer, a workstation or a light portable device. The communication device 200 comprises a communication bus 213 to which there are preferably connected:

a central processing unit 211, such as a microprocessor, denoted CPU;

a read only memory 207, denoted ROM, for storing computer programs for implementing the invention. In particular, ROM 207 may store the various predefined processing profiles (and thus the characteristics of the corresponding predefined amount of resources) and associated specific priority parameter values;

a random access memory 212, denoted RAM, for storing the executable code of methods according to embodiments of the invention as well as the registers adapted to record variables and parameters necessary for implementing methods according to embodiments of the invention. In particular, RAM 212 is used to store the current priority parameter values as received for each request or group of requests; and at least one communication interface 202 connected to the radio communication network 100 over which HTTP/2 frames can be exchanged with other communication devices (usually clients devices). The frames are written from a FIFO sending memory in RAM 212 to the network interface for transmission or are read from the network interface for reception and writing into a FIFO receiving memory in RAM 212 under the control of a software application running in the CPU 211.

Optionally, the communication device 200 may also include the following components:

a data storage means 204 such as a hard disk, for storing computer programs for implementing methods according to one or more embodiments of the invention;

a disk drive 205 for a disk 206, the disk drive being adapted to read data from the disk 206 or to write data onto said disk;

a screen 209 for displaying decoded data and/or serving as a graphical interface with the user, by means of a keyboard 210 or any other pointing means.

The communication device 200 can be connected to various peripherals, such as for example a digital camera 208, each being connected to an input/output card (not shown) so as to supply data to the communication device 200.

The communication bus provides communication and interoperability between the various elements included in the communication device 200 or connected to it. The representation of the bus is not limiting and in particular the central processing unit is operable to communicate instructions to any element of the communication device 200 directly or by means of another element of the communication device 200.

The disk 206 can be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may be stored either in read only memory 207, on the hard disk 204 or on a removable digital medium such as for example a disk 206 as described previously. According to a variant, the executable code of the programs can be received by means of the communication network 203, via the interface 202, in order to be stored in one of the storage means of the communication device 200, such as the hard disk 204, before being executed.

The central processing unit 211 is adapted to control and direct the execution of the instructions or portions of software code of the program or programs according to the invention, which instructions are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 3:
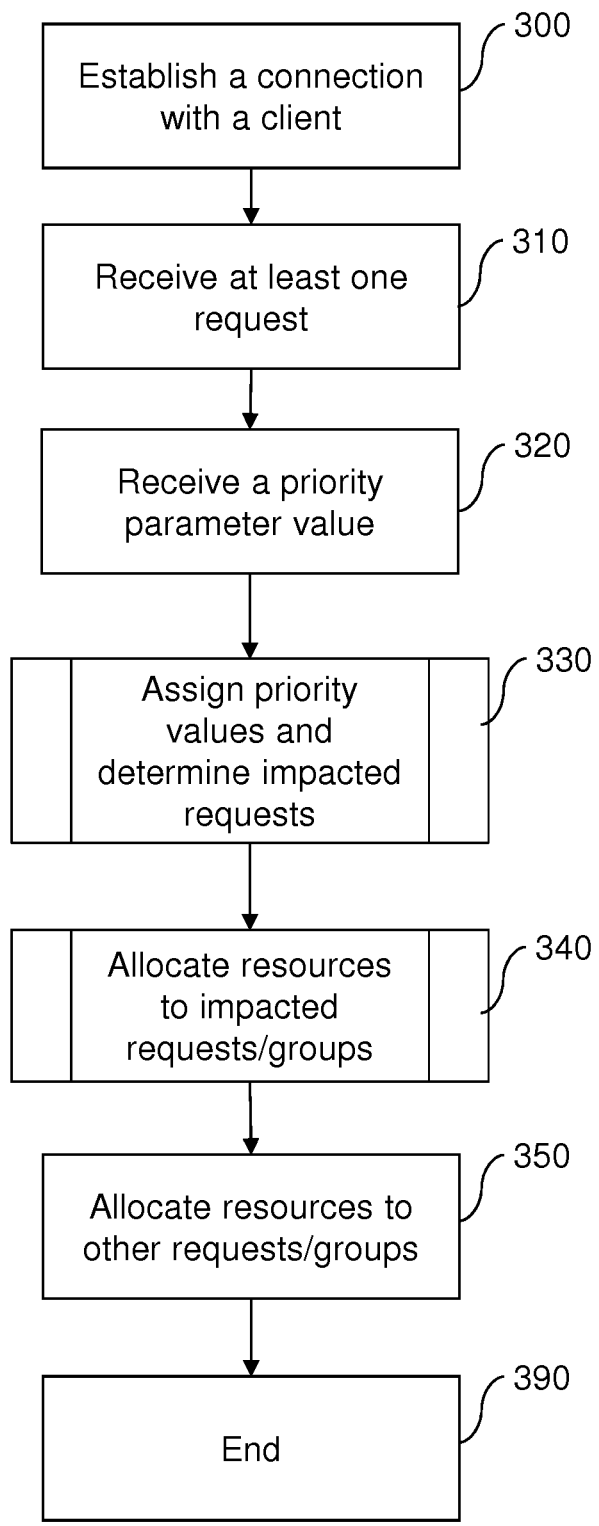
FIG. 3 is a flowchart illustrating general step of some embodiments of the invention for a client device to control allocation of resources by a server device, using a conventional priority scheme.

FIG. 3 is a flowchart illustrating general step of embodiments of the invention for a client device to control allocation of resources by the server device, using the conventional priority scheme. This process is executed by the server device.

At step 300, a connection, typically a TCP connection for HTTP/2 exchanges, is established between the server device and a client device. During setup of the connection, the server and client devices may also exchange messages in order to check they share the same understanding of the specific values in the meaning of the invention. This may be done by exchanging definitions of the predefined processing profiles described above.

In a simple embodiment, only one flag (one bit) may be exchanged to reciprocally indicate they (the server and client devices) both implement the invention.

At step 310, the server device receives at least one request from the client device over the connection.

As previously described, if groups of requests are considered, the received request may belong to a group.

At step 320, the server device receives a priority parameter value from the client device. The priority parameter value may be part of a received request or be received as a distinct message (e.g. a PRIORITY frame in HTTP/2).

In the message from the client device, the priority parameter value is associated with one or more received requests, typically by indicating a request identifier (stream ID) along with the priority parameter value. The priority parameter value may also be associated with other structures such as groups of received requests (using a group ID). The request or group indicated in the message is named "designated" request or group.

Note that although a single priority parameter value is described in the present examples, the message giving a priority indication may comprise values for one or more priority parameters. For instance, a first priority parameter may be associated with a given request, while a second priority parameter may be associated with a given group. Each priority parameter indicates whether the corresponding item (e.g. a request or a group of requests) is highly or lowly needed by a client. These indications should be considered by the server device when it processes requests. In particular, the server device should consider these indications to determine how to schedule the sending of different responses.

However some combinations of priority parameter values may be forbidden (hence discarded if they occur), or rules for disambiguating such cases should be defined.

For instance, a hierarchy of priority parameter values may be defined so that only the highest/lowest specific value applies in case where multiple specific values are provided by the client device.

Alternatively, if some priority parameter values are assigned to requests and some others to groups of requests, the priority parameter value for a group may define the resources allocated to the group, and the priority parameter value for a request may be applied on the resources allocated to a given group (instead of on the resources allocated to the connection). For instance, allocating all the resources to the processing of a group does not prevent allocating 0 resource to a given request of the group. Conversely, allocating all the resources to a request belonging to a group may be possible even if a group is allocated 0 resource, thereby allocating zero resource to the request. However, changing only the weight of the group will result in having all the resources allocated to the group that are allocated to said request.

At step 330, the priority parameter value as received is examined. If the received priority parameter value belongs to the second subset of possible values, a conventional process of the priority parameter value is performed, meaning that the priority parameter value is assigned to the request/group of requests specified together with this value in the frame received at step 320.

The case where the received priority parameter value is a specific value, i.e. belongs to the first subset as described above, may lead to the assigning of specific priority values to requests/groups of requests that are different from the request/group of requests specified together with this value in the frame received at step 320.

Therefore, step 330 consists in assigning new priority values to requests or groups of requests as a function of the received priority parameter value and in determining which requests are impacted by the received priority parameter value if the latter is a specific value.

Figure 4:
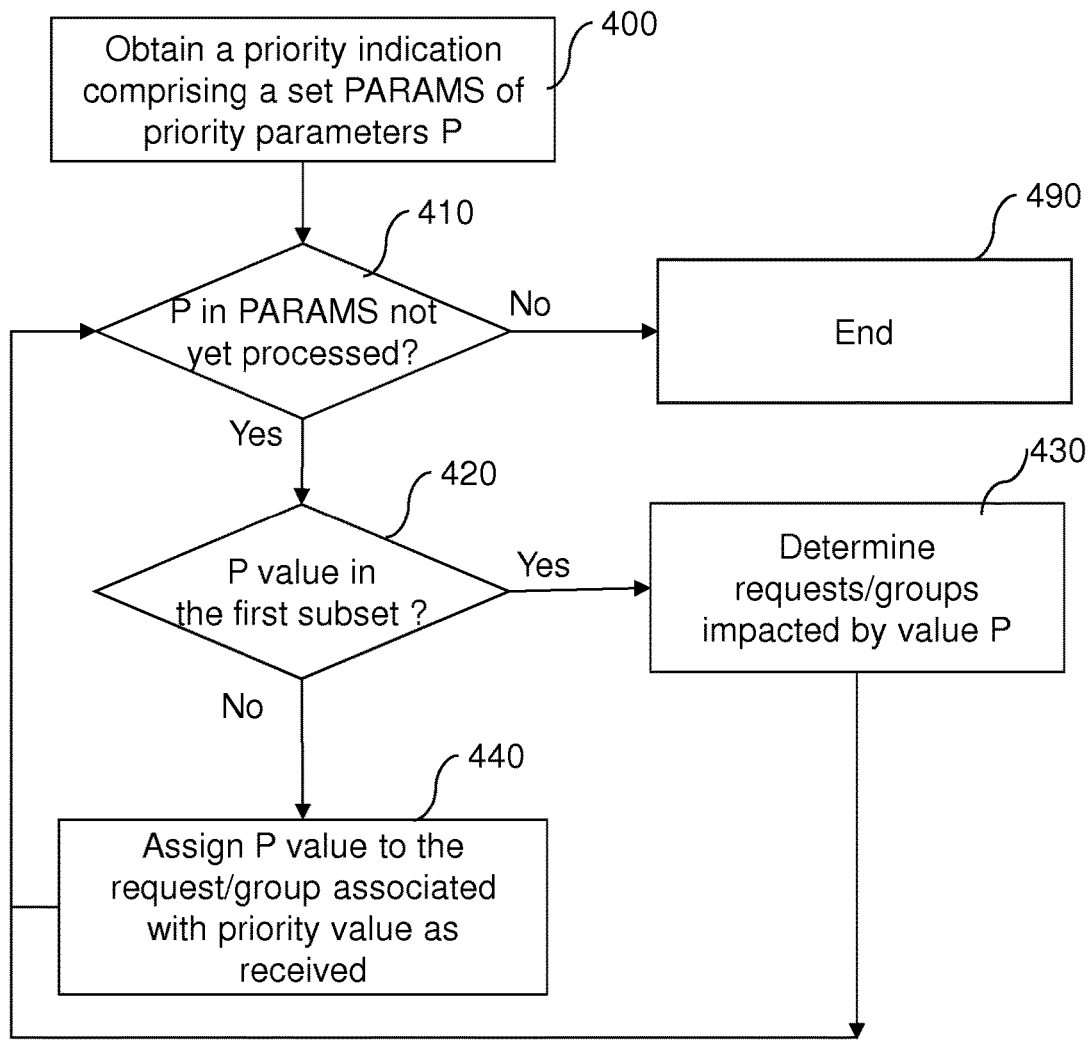
FIG. 4 is a flowchart illustrating general steps of the assigning of new priority parameter values to requests/groups of requests based on received priority parameter value or values and of the determination of the impacted requests, according to some embodiments of the invention.

An embodiment of step 330 is now described with reference to FIG. 4. FIG. 4 is a flowchart illustrating general steps of the assigning of new priority parameter values to requests/groups of requests based on received priority parameter value or values and of the determination of the impacted requests.

At step 400, a priority indication comprising a set of priority parameter values PARAMS is obtained. This is the set of priority parameter values received at step 320.

The set of values is iterated through steps 410 to 440.

At step 410, each priority parameter value P is successively selected by checking whether there remains a value P of the set that has not yet been processed.

A remaining value P (current value P) is compared at step 420 with the specific values defined in the first subset of possible values for the priority parameter considered.

If the current value P is not a specific value, but a value belonging to the second subset for the priority parameter considered, step 420 is followed by step 440 where priority value P is assigned to the request/group of requests designated in association with the priority parameter value P received at step 320. This is the conventional assigning of priority values.

If the current value P is a specific value belonging to the first subset for the priority parameter considered, step 420 is followed by step 430 where the requests/groups of requests impacted by the current specific value are determined. These requests/groups of requests impacted by the current specific value may be different from the request/group of requests specified in association with the current specific value in the frame received at step 320.

They can be determined using the predefined processing profile associated with the current specific value P, because the profile defines the processing behaviour of the server device with respect to the requests/groups that are concerned by such behaviour.

As suggested in above examples, the requests/groups of requests impacted by the current specific value may be the designated request/group (i.e. the request/group of requests specified in association with the specific current value in the frame received); all the requests/groups of the connection; all the requests/groups of the connection except the designated request/group; or all the requests/groups of the connection having a corresponding priority parameter value above or below a predefined threshold.

Note that at this stage, the impacted requests/groups of requests have been identified and their previous priority value (before entering a new state with new allocation of a predefined amount of resources) are still stored/saved in memory of the server device (because they have not been modified). This is to make it possible to resume the conventional processing as soon as the constraint due to the current specific value P has ended, by using this previous priority value. This is for example used when the request switches from pausing (constrained state) to resuming (processing state) due to the end of processing the high priority request that has conducted the request to be paused or suspended. The persistent storing of the previous priority values is particularly useful when the criteria for leaving the constrained state is independent to receiving a new priority parameter value for the request.

In particular cases, for example when value P implies allocating zero resource to some impacted requests/groups of requests different from the "designated" request/group of requests, a priority parameter value corresponding to the allocation of zero resource may be assigned to the impacted requests/groups of requests. For instance, the minimum value for the priority parameter considered may be used. In this case, the previous priority values are preferably stored in another memory of the server device to allow restoring them upon resuming the impacted requests.

In some cases, the value P may not lead to allocating a predefined amount of resources to the "designated" request/group of requests. In such a case, this value P may be assigned to the impacted requests/groups of requests, or alternatively, a predetermined value may be assigned to the impacted request/group of requests that would result in the expected behaviour of the server device, said predetermined value not being associated specifically with the allocation of a predefined amount of resources but generally with a relative allocation of resources that fits the expected behaviour. For instance, in the case where the value P drives the pausing of all the requests/groups except the "designated" request/group, the "designated" request/group may be assigned the maximum priority value, which value is not associated with the allocation of a predefined amount of resources. Therefore, if a next "non-specific" value for the same priority parameter is received and regards another request, both "designated" and other requests will share available resources based on their relative priority parameter values (while the impacted requests would remain paused).

Steps 440 and 430 are followed by step 410 to process the next priority parameter value P.

When all the values P from PARAMS have been processed (test 410), the process ends at step 490.

Back to FIG. 3, next to step 330 where the impacted requests/groups of requests have been identified, step 340 provides the actual allocation of the resources to the impacted requests or groups of requests. This process is now described with reference to FIG. 5.

Figure 5:
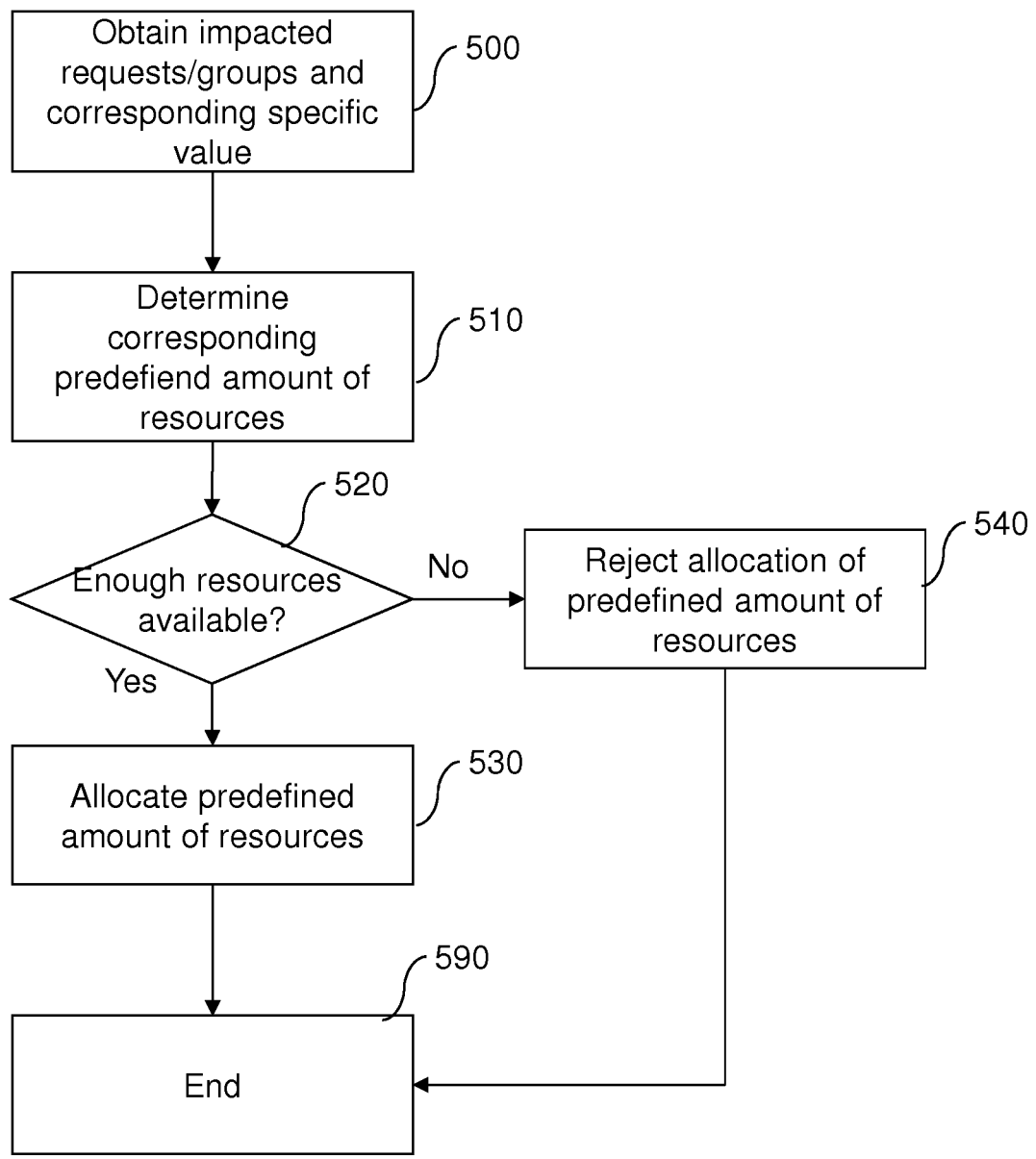
FIG. 5 is a flowchart illustrating general steps of the actual allocation of a predefined amount of resources to the processing of a request/group of requests, according to some embodiments.

FIG. 5 is a flowchart illustrating general steps of the actual allocation of a predefined amount of resources to the processing of a request/group of requests.

At step 500, impacted requests or groups of requests and corresponding specific value P (thus defining the predefined amount of resources to allocate) are obtained.

At step 510, the corresponding predefined amount of resources is determined based on the specific value P. This predefined amount is obtained from the predefined processing profiles in memory of the server device.

Next, step 520 consists in checking whether enough resources are available compared to the predefined amount.

In particular, the resources already allocated (and currently used) to requests/groups due to previous specific values are not available for a new allocation.

Of course, if these resources have been released upon meeting one release triggering event, they can be allocated again for the predefined amount currently processed. This is because the resources remain allocated to the same impacted requests/groups until the release triggering event occurs.

An example of such triggering event as described above is the completion of the processing of a high priority request for which all or part of the resources have been allocated.

Another example of a triggering event is the reception (in a PRIORITY frame) of a new priority parameter value for an impacted request/group of requests.

For instance, a new priority parameter value may be received for a request currently paused or suspended, which value belongs to the second subset (i.e. not specific in the meaning of the invention). This new value changes the state of processing of the request so that it now depends on other priority parameter values associated with the other requests.

By sending such a priority parameter value, the client device is able to indicate that a request should no more be processed using a predefined amount of resources and that the processing of the request, and in particular the sending of corresponding response, should be done according to the priority scheme according to the prior art (HTTP/2). In such a case, the resources previously allocated to process the request are released.

Yet another example of a triggering event is the absence of a currently processed request that has a priority value belonging to the second subset (i.e. all responses with a priority value belonging to the second subset have been transmitted to client). Such particular triggering event may be used if the other requests are currently paused (i.e. allocated with zero resources) or suspended (i.e. not processed due to allocation of all the resources to the requests). In such a case, there is no need for the server device to receive a new priority parameter value of the second set to resume the currently paused/suspended requests. The server device has only to detect that no request being processed according to the conventional allocation of resources (i.e. having priority values of the second subset) remain, to trigger the resuming of the requests currently paused or suspended. Preferably, the priority parameter values that were associated with these requests just before they were paused or suspended may typically apply again.

Yet another example of a triggering event is the elapsing of a predefined amount of time. This predefined amount of time may depend on the specific value considered.

For instance, a specific value may define the allocation of a predefined amount of resources for a period of 30 seconds, while another one may define another allocation of resources for a period of 60 seconds.

This time-limited allocation of resources requires that the client device periodically sends again the priority parameter specific value (or another one) in order to extend the duration of the allocation.

Upon reaching the end of the predefined amount of time, the conventional relative allocation of resources may apply to the impacted requests, using their priority parameter values that were associated with them just before the requests were impacted.

These various examples of triggering events may be used as criteria to trigger the release of allocated resources. Some embodiments may require that two or more criteria be possible to trigger the release of allocated resources.

For instance, if the server device supports the pausing of a request based on a priority parameter, a first specific value for this priority parameter may be associated with a state where a new priority value has to be received to leave from pausing and resume processing, while a second specific value for this priority parameter be associated with a state where the leaving from pausing and thus the resuming of the processing is triggered when no request being processed according to the conventional approach (i.e. with associated priority value in the second subset) remain.

If test 520 shows that enough resources are available, the predefined amount of resources is actually allocated to the processing of the impacted requests/groups. This is step 530. Step 530 is followed by the end of the process (step 590).

On the other hand, if not enough resources are available at step 520, the allocation of a predefined amount of resources to the impacted requests/groups of requests is rejected at step 540. In such a case, a warning is sent back to the client device, so that it can change the priority value in the PRIORITY frame in order to ask for less resource to be allocated or so that it can change the priority value of other requests (in order to free more resources) and resend the same PRIORITY frame.

Next to step 540, the process ends (step 590).

In a variant of this embodiment of FIG. 5, preference is given to most recent PRIORITY frames, i.e. to most recent new specific values for a priority parameter.

For instance, it may be decided to always allocate the predefined amount of resources at step 510 (steps 520 and 540 do not longer exist), regardless the resources currently available for allocation (and thus the resources already allocated to requests impacted by a specific value previously received). In such a case, if resources lacks in the resources available to reach the predefined amount of resources, the lacking resources are taken from the oldest allocation of a predefined amount of resources that is still actual.

For example, if a previous request has been allocated 80% of the resources and if for another request 40% of the resources need to be allocated, then 20% may be obtained from the 80% of the previous request, so that 40% can be allocated to the other request (in this case, only 60% remain allocated to the previous request).

With such policy, the fact that a more recent priority parameter value associated with the allocation of a predefined amount of resources is received may be a release triggering event to trigger the release of some (or all) of the resources previously allocated to the processing of a previous request.

Back to FIG. 3, next to step 340, step 350 consists in allocating the relative resources to the requests or groups of requests that are associated with a priority parameter value of the second subset (i.e. conventional allocation of resources).

Practically, these requests or groups of requests share the remaining resources, i.e. those that have not been allocated to requests or groups of requests impacted by specific values. The remaining amount of resources is shared between the requests or groups of requests based on their priority parameter values.

For instance, if a weight non-specific value is modified for a group of requests, the resources allocated by the server device for the processing of the corresponding requests should be modified accordingly. Given that the resources are shared between requests having non-specific priority values, this modification typically impacts not only the group of requests whose weight has been modified, but also other groups of requests.

As another example, if a second request has a lower (non-specific) priority value than a first request which is being processed, but that the second request is later on assigned a greater (non-specific) priority value through a new PRIORITY frame, the second request should be processed immediately, while the processing of the first request should be interrupted until the processing of the second request ends (or until a new priority parameter value is received that modifies again the allocation).

Step 350 is followed by the end of the process (step 390).

Turning now to the client device's perspective, FIG. 6 is a flowchart illustrating general steps at the client device to request a specific allocation of a predefined amount of resources for the processing of some target requests.

At step 600, a connection is established between the client device and the server device. This is the same as the connection established during above step 300.

At step 610, a set of at least one request SR to be processed with a predefined amount of resources (i.e. independently from other requests) is determined.

Note that if groups of requests are defined, SR may correspond to a given group or to multiple groups of requests, or to one or more groups as well as one or more requests (i.e. said requests belong to a group that is not fully comprised in SR).

The determined set of requests corresponds either to responses that are highly needed, either to responses that are lowly needed; whether a response is highly or lowly needed depends on the current context, and if a response is highly needed, this may lead to consider that other responses are lowly needed, while in a different context, those responses would not be considered as lowly needed. One skilled in the art would directly understand that the invention makes it possible for the client device to force the server device to allocate a large and predefined amount of resources for the processing of requests for which responses are highly needed, and to allocate few or no resources for the processing of requests for which responses are lowly needed.

It should be noted that the client device may be connected to different server devices, and that in order to obtain a highly needed response from a given server device, the client device may request that all resources made available for the connection with the given server device should be allocated to the request corresponding to the highly needed response. But the client device may also request the other server devices to pause the processing of all the requests they have received from the client device. In this case, the set SR comprises requests associated with different connections. This requires the client device to send specific priority values to each appropriate server device depending on the requests. By doing so, the client device increases the likeliness that the whole bandwidth of the network is made available for the highly needed response.

However, depending on the circumstances, the client device may not wish to adopt such an aggressive policy. For instance, the client device may request a given server device to allocate all the resources for the processing of a given request, but may not request other servers it is connected to that their requests are paused.

Also, an alternative to the requesting that all the resources should be allocated to a given request or a given group of requests consists in requesting that all requests but a given one or all the requests but the ones from a given group should be paused. The difference between these two options is that only a single request or group of requests is allocated all the resources, whereas even if all requests or groups of requests but one have been paused, another request or group of requests may be sent (for instance if a new priority parameter value is received for the request or group of request). Therefore, if two requests or groups of requests are highly needed by the client device, the latter may first pause all requests or groups of requests except one of the two, and then indicate through another PRIORITY frame (priority parameter value and associated request ID) that the other of the two should no more be paused.

Alternatively, the client device may pause individually all the requests or groups of requests that are not highly needed. But this may require sending more priority parameter values (one for each request or group of requests), thus requiring for the server device to have more time to take into account the new priority parameter values from the client device.

Once the set SR has been determined, the client device requests at step 620 the server device for the allocation of the predefined amount of resources for each request from SR, using the specific values for priority parameters as extensively described above. This may be done using PRIORITY frames.

The choice of the priority parameter values at the client device may be made for example at two levels.

First, at application level, where a given application can decide to use specific values for a priority parameter with a view to optimize its usage of the bandwidth, in particular to obtain a highly needed resource more quickly. However, such an application can only select its own priority parameter values, which means that it cannot fully optimize the bandwidth usage for a given device.

Therefore, a component system running on the client device may also modify the priority parameter values, either based on applications indications (e.g. through a specific API), or by defining its own policy, in order to optimize bandwidth usage across all applications at device level.

Once the frames with the specific values have been sent, the process ends at step 690.

The description above involves a server device which is usually a data server, i.e. a server device that is directly requested by the client device to obtain data or a service. However, in conventional networks, the requests from the client device may be processed by a proxy server which is half way between the client device and the server device along the established connection. The proxy server is a server from the client device's perspective, but it is also a client from the data server device's perspective when forwarding the requests from the client device.

FIG. 7 is a flowchart illustrating steps specific to a proxy server in some embodiments of the invention. It describes how the proxy server may modify, based on its own policy and context, priority parameter values for requests it forwards to the server device.

This is because the proxy server has a different context from the client device and thus may handle differently its link (and thus request) with the data server compared to what the client device does with the proxy server.

For example, it is assumed that the client device sends a request REQ1 with non-specific priority value NSPV to the proxy server. The latter forwards the request (named REQ1') to the data server.

Later on, the client device modifies the priority value for REQ1 due to changing conditions. For example, the client device specifies the specific priority value 0 defining the allocation of zero resources for REQ1 (i.e. pausing). The proxy server thus applies the pausing to REQ1, meaning that it does not allocate resources for the processing (in particular sending of a response) of the request.

In its relationship with the data server, the proxy server may adopt the same behaviour (requesting pausing). However, it may also adopt another strategy because it may not have the same constraints (changing conditions) due to its own policy and context.

The process of FIG. 7 seeks to provide a way to handle this situation from the proxy's perspective, upon receiving a new priority parameter value from the client device, in particular a specific value.

At step 700, a predefined amount of resources available at the proxy is allocated to the processing of a request or group of requests received by the proxy from the client device, based on the received new priority parameter value. This may be done using the mechanisms of the invention as described above.

At step 710, the forwarded requests/groups of requests corresponding to the said request/group of requests are determined. This is because when the proxy forwards requests, it creates associated (or corresponding) requests that it sends to the data server device.

In particular, these forwarded versions of requests may have different priority parameter values from the values of the corresponding requests directly received from the client device. This is because the proxy does not have the same constraints as the client device as mentioned above. For instance, the proxy may aggregate requests received from different client devices, in which case, the forwarded requests may all belong to a single group. In such circumstances, step 710 would consist in determining the forwarded requests comprised in said group.

At step 720, it is determined whether the priority parameter values of the determined forwarded requests/groups of requests can be modified.

For instance, let's consider that at step 700, the processing of the request considered has been paused based on a specific priority value sent by the client device. It is also assumed that the corresponding request forwarded by the proxy to the data server device belongs to a group created by the proxy by aggregating all the requests forwarded to said server.

In this case, even though the request has been paused in the exchange between the client device and the proxy, the group comprising the corresponding forwarded request should probably not be paused as this would require pausing all the forwarded requests. This would be detrimental to the processing of high priority requests which are aggregated in this group.

In the example above, it means that the proxy thus does not modify the priority NSPV for REQ1' in its exchanges with the data server device.

On the other hand, if the proxy has not aggregated the request considered with another request, the priority parameter values of the forwarded request may be modified to a priority value providing the same allocation of resources as the new priority parameter value received from the client device to trigger step 700.

In the example above, it means that the proxy thus modifies the priority NSPV to specific priority value 0 for REQ1' in its exchanges with the data server device.

If the priority parameter values can be modified (test 720), the priority parameter values are modified by the proxy at step 730 for the corresponding forwarded request.

For instance, if the client device requests the pausing of a request, the proxy should not send corresponding response to said client, but this does not prevent the proxy from obtaining the response from the appropriate server device. This is because, the proxy may consider that there is more bandwidth between itself and the server device, than between the client device and itself. Consequently, even if the client device prefers pausing a request to recover more bandwidth for the transmission of a response, the proxy does not necessarily have to also request the pausing of the corresponding forwarded request to the server device, in particular if there is enough bandwidth between the proxy and the server device. Accordingly, the proxy may simply decide to assign a lower priority parameter (non-specific) value to the corresponding forwarded request, but not a specific value corresponding to the pausing of the processing of the request (i.e. allocation of zero resource).

To sum up, upon receiving a new priority value for a request from the client device, preference is given to not modifying the existing priority value at the proxy as long as the request is aggregated with other high priority requests into a group of requests forwarded to the data server device. On the contrary, as soon as the request is not aggregated, its priority value may be updated since it does not impact the processing of other requests.

Similarly, even if the client device requests allocating all the resources of the proxy for the connection to the processing of a specific request, the proxy may consider that enough resources (e.g. bandwidth) are available between itself and the server device, so that there is no need to request the server device to allocate all its resources for the connection to the processing of the corresponding forwarded request. In this case, the proxy may for instance only assign a higher priority to the forwarded request.

Alternatively, in some cases, the proxy may reckon that the bandwidth is not guaranteed and that allocating a non-null predefined amount of resources of the server device to the processing of a request or group of requests would meet more closely the client needs. In this case, the proxy may assign a specific value corresponding to the allocation of a non-null predefined amount of server resources to the processing of the request or group of requests. For instance, if the client device requests the allocation of all resources to the processing of a given request, the proxy may request the allocation of 10% of the resources made available by the server device for the connection to the processing of the corresponding forwarded request.

Next to step 730, or if the priority parameter values cannot be modified at step 720, the process ends (step 790).

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of processing requests in a server device, comprising, at the server device, the steps of:
   receiving requests from a client device within one and the same connection established with the client device;
   receiving, from the client device, a priority parameter value associated with at least one designated request of the received requests;
   allocating resources of the server device for processing one or more target requests of the received requests based on the priority parameter value; and processing simultaneously the target requests using the allocated resources;

wherein, for each of the target requests, if the received priority parameter value belongs to a first subset of possible values for the priority parameter, the server device allocates, independently to other priority parameter values associated with other received requests for processing the target request, a predefined amount of resources that is specific to the received priority parameter value; and if the received priority parameter value belongs to a second subset of possible values for the priority parameter, the server device allocates, for processing the target request, an amount of resources that depends on other priority parameter values associated with other received requests.

2. The method of claim 1, wherein one possible value of the first subset used to allocate an amount of resources independently to other priority parameter values associated with other received requests, defines an amount of zero resource for allocation to the processing of the target request considered, and if received priority value associated with the target request considered equals the one possible value, the processing of the target request or the quests is paused.

3. The method of claim 2, wherein if the processing of the target request considered is paused, the method further comprises resuming the processing of the target request or requests upon occurrence of an event triggering the release of the predefined amount of allocated resources.

4. The method of claim 3, wherein the processing of the target request or requests is resumed upon occurrence of a release triggering event, the target request or requests being assigned, when resuming, priority parameter value or values associated with them just before they were paused.

5. The method of claim 1, wherein one possible value of the first subset defines a predefined amount equal to all the resources available at the server device for allocation to the processing of the target request or requests.

6. The method of claim 5, wherein the received priority parameter value equals the one possible value so as to process only the target request or requests with all the resources allocated, thereby suspending the processing of other requests; and the method further comprises, upon occurrence of an event triggering the release of the predefined amount of allocated resources, resuming the processing of the other requests based on priority parameter values associated with them just before they were suspended.

7. The method of claim 1, wherein one possible value of the first subset defines a predefined amount of resources that is relative to resources available at the server device, for allocation to the processing of the target request.

8. The method of claim 1, wherein the at least one target request includes all the requests received from the client device within the connection.

9. The method of claim 1, wherein the at least one target request includes all the requests received from the client device within the connection except the at least one designated request.

10. The method of claim 1, wherein the at least one target request is the at least one designated request.

11. The method of claim 1, wherein the at least one target request includes all the requests received from the client device within the connection that are associated with respective priority parameter values that are all above or all below a predefined priority threshold.

12. The method of claim 1, further comprising allocating first the predefined amounts of resources to the target requests for which a priority parameter value belonging to the first subset has been received, and then sharing the remaining resources of the server device between the remaining received requests from which a priority parameter value belonging to the second subset has been received.

13. A server device in a communication network, comprising:

at least one predefined processing profile which associates a predefined amount of resources of the server device with a specific priority parameter value;

a receiving module configured to receive requests from a client device within one and the same connection established with the client device and to receive, from the client device, a priority parameter value associated with at least one designated request of the received requests;

a resource allocating module configured to allocate resources of the server device for processing one or more target requests of the received requests based on the received priority parameter value; and a processor to process simultaneously the target requests using the allocated resources for each of the target requests;

wherein the resource allocating module is configured:

if the received priority parameter value belongs to a first subset of possible values for the priority parameter, to determine a predefined processing profile based on the received priority parameter value and to allocate independently to other priority parameter values associated with other received requests, for processing the target request, the predefined amount of resources corresponding to the determined predefined processing profile; and if the received priority parameter value belongs to a second subset of possible values for the priority parameter, to allocate, for processing the target request, an amount of resources that depends on other priority parameter values associated with other received requests.

14. The server device of claim 13, wherein one predefined processing profile associated with one possible value of the first subset used to allocate an amount of resources independently to other priority parameter values associated with other received requests, defines an amount of zero resource for allocation to the processing of the target request considered, and if the received priority parameter value associated with the target request considered equals the one possible value, the processing of the target request or requests is paused.

15. The server device of claim 14, wherein the processing of the target request or requests upon occurrence of an event triggering the release of the predefined amount of allocated resources is resume if the processing of the target request considered is paused.

16. The server device of claim 15, configured to store in memory priority parameter value or values associated with the target request or requests just before the latter are paused, so that the processing of the target request or requests is resumed upon occurrence of a release triggering event, the target request or requests being assigned, when resuming, their corresponding stored priority parameter value or values.

17. The server device of claim 13, wherein one predefined processing profile associated with one possible value of the first subset defines an amount equal to all the resources of the server device for allocation to the processing of the target request.

18. The server device of claim 17, configured to process only the target request or requests with all the resources allocated when the received priority parameter value is associated with the predefined processing profile defining an amount equal to all the resources for allocation, thereby suspending the processing of other requests; and to resume, upon occurrence of an event triggering the release of the predefined amount of allocated resources, the processing of the other requests based on priority parameter values associated with them just before they were suspended.

19. The server device of claim 13, configured to first allocate the predefined amounts of resources to the target requests for which a priority parameter value belonging to the first subset has been received, and then to share the remaining resources of the server device between the remaining received requests from which a priority parameter value belonging to the second subset has been received.

20. A non-transitory computer-readable medium storing a program which, when executed by a microprocessor or computer system in a server device of a communication network, causes the server device to perform the steps of:

receiving requests from a client device within one and the same connection established with the client device;

receiving, from the client device, a priority parameter value associated with at least one designated request of the received requests;

allocating resources of the server device for processing one or more target requests of the received requests based on the priority parameter value; and processing simultaneously the target requests using the allocated resources for each of the target requests;

wherein if the received priority parameter value belongs to a first subset of possible values for the priority parameter, the server device allocates, independently to other priority parameter values associated with other received requests, for processing the target request, a predefined amount of resources that is specific to the received priority parameter value; and if the received priority parameter value belongs to a second subset of possible values for the priority parameter, the server device allocates, for processing the target request, an amount of resources that depends on other priority parameter values associated with other received requests.

\* \* \* \* \*